United States Patent [19]

Hodgson et al.

[11] 4,204,953

[45] May 27, 1980

[54] PROCESS FOR ALKALINE SCALING

[75] Inventors: Thomas D. Hodgson, Abingdon; Kenneth W. Carley-Macauly, Stanford in the Vale; Sidney Smith, Alderley Edge, all of England

[73] Assignee: Ciba-Geigy Limited, London, England

[21] Appl. No.: 940,132

[22] Filed: Sep. 6, 1978

Related U.S. Application Data

[63] Continuation of Ser. No. 570,371, Apr. 22, 1975, abandoned.

[30] Foreign Application Priority Data

Apr. 30, 1974 [GB] United Kingdom ............... 18980/74

[51] Int. Cl.$^2$ .............................................. C02B 5/06
[52] U.S. Cl. ............................ 210/58; 159/DIG. 13
[58] Field of Search ................................. 210/57, 58; 159/DIG. 13

[56] References Cited

U.S. PATENT DOCUMENTS

| | | | |
|---|---|---|---|
| 2,640,808 | 6/1953 | Ulmer | 210/16 |
| 3,135,670 | 6/1964 | Ristaino et al. | 202/57 |
| 3,514,376 | 5/1970 | Salutsky | 210/58 |
| 3,518,204 | 6/1970 | Hansen et al. | 210/58 |
| 3,682,224 | 8/1972 | Bleyle | 210/58 |
| 3,810,834 | 5/1974 | Jones et al. | 210/58 |

FOREIGN PATENT DOCUMENTS 747462 9/1944 Fed. Rep. of Germany.

*Primary Examiner*—Thomas G. Wyse
*Attorney, Agent, or Firm*—Wenderoth, Lind & Ponack

[57] ABSTRACT

A method for inhibiting the deposition of scale from saline water having bicarbonate alkalinity on to heat exchanger surfaces in a saline water evaporation plant comprises adding a mineral acid to neutralize part, but not all, of the bicarbonate alkalinity, and also adding a scale inhibiting additive to the saline water.

2 Claims, No Drawings

PROCESS FOR ALKALINE SCALING

This is a continuation of application Ser. No. 570,371, filed Apr. 22, 1975, now abandoned.

This invention relates to the inhibition of scale formation in saline water evaporators engaged, for example, in producing fresh water from saline water.

By saline water, we mean water containing one or more inorganic salts dissolved therein, such as, for example, to render it unsuitable for industrial or domestic use, and includes sea-water, brackish water and estuarine water.

Alkaline scaling (e.g. in the form of Ca CO$_3$ or Mg(OH)$_2$) on the heat exchange surfaces of saline water evaporators is a serious problem caused by the presence of bicarbonates of calcium and magnesium in the saline water. It may be treated, for example, by so-called acid dosing wherein sufficient acid, usually sulphuric acid or hydrochloric acid, is added to the saline water to neutralise all or a substantial part of the alkaline content of the saline water. Whilst this can effectively prevent all scale formation, acid dosing has the disadvantage of accelerating the corrosion of the plant because of the relatively low pH produced in the brine, combined with the difficulty, in practice, of ensuring accurate continuous dosing under the operating conditions of saline water evaporators (which may cause even lower pH's than were intended to be reached for limited periods). Another method of treating alkaline scaling is to add a scale inhibiting additive to the saline water which causes less scale to be formed than without treatment, and in some cases of a softer variety. Such additives are known in the art and are usually termed threshold additives, examples of which are polyphosphate and polycarboxylic acid threshold additives, e.g. hydrolysed polymaleic anhydride.

We have now found that unexpected advantages may be obtained by using a combination of acid dosing and threshold additive addition.

Thus, according to the present invention, a method of inhibiting the deposition of scale from saline water, having bicarbonate alkalinity, onto the heat exchange surfaces of a saline water evaporation plant comprises adding a mineral acid to the saline water to neutralise part but not all of the bicarbonate alkalinity thereof, and adding a scale inhibiting additive to the partly neutralised saline water, the amount of acid adding being such that the pH of the saline water which is flowing within the plant is not reduced below 7.5. The above mentioned pH is the pH as measured on a sample of the saline water at 25° C.

We have surprisingly found that the scale inhibiting effect produced by the present method is much greater than would be expected from a knowledge of the individual scale inhibiting properties of acid and of the additive, and any scale which is formed is softer than that produced by the use of the additive alone or acid alone if less than the stoichiometric quantity is used.

Since the neutralisation by the acid is partial only, the above mentioned corrosion problem which occurs when acid alone is used, is to a large extent overcome.

We have referred to a pH "in the saline water which is flowing within the plant" because CO$_2$, produced during neutralisation, has been substantially outgassed from such water, and the pH thereof is therefore not suppressed by the presence of CO$_2$. Generally, we prefer that the pH of the flowing water is at least 8.

The proportions of acid and of scale inhibiting additive which are added will depend upon a number of factors, for example, the characteristics of the brine and the characteristics of the evaporator. We prefer, however, that the amount of acid added is such that less than 80% of the bicarbonate alkalinity of the saline water is neutralised, preferably from 30 to 80% and more preferably from 50 to 75%. Particular proportions which we have found very satisfactory in our tests are, however, an amount of acid such that 50% of the bicarbonate alkalinity of the saline water is neutralised. The amount of scale inhibiting additive used may vary from 0.5 to 20 ppm of water treated, preferably from 0.5 to 10 ppm and more preferably from 0.5 to 5 ppm. These particular proportions may, of course, be varied to meet particular circumstances.

The acid used in the present method is preferably a mineral acid, such as sulphuric acid or hydrochloric acid, on grounds of cost and availability.

Examples of additives which may be used in the present method are scale inhibiting additives known in the art, such as polyphosphates, polyacrylates, polymethacrylates, phosphonates, aminophosphonates, polymeric carboxylic acids such as the hydrolysed polymaleic acid anhydrides having a molecular weight in the range from 300 to 5000 which are described in West German Offenlegungsschrift 2 159 172, and co- and ter-polymers of unsaturated acids with one or more other monomers such as those described in our copending Application No. 7181/73.

The present method may be used in a variety of types of saline water evaporator, for example, for the production of fresh water, in Multistage Flash Evaporators, Multieffect Evaporators such as the Vertical Tube (thin film) Evaporator, the Horizontal Falling Film (or Spray film) Evaporator, and submerged Tube evaporators.

The acid and additive may be added to the saline water separately or they may be pre-mixed and added together. Accordingly the present invention also provides a composition comprising a mineral acid, particularly hydrochloric acid or sulphuric acid, and from 0.5–50% by weight, based on the weight of the acid, of a scale inhibiting additive, as described above.

Preferably the composition contains 0.5–25% by weight of additive and more preferably 0.5–12.5% by weight, based on the weight of acid.

The invention will now be particularly described in the following examples.

The general procedure was as described in a paper by Elliot et al in the 3rd International Symposium on Fresh Water from the Sea, Vol. 1, p 46 and is broadly as follows. Sea water was treated with the quantities of acid and/or additive specified in the examples below and continuously fed to a test cell from which there was a corresponding discharge of brine. The contents of the cell were mixed by an air sparge which also served to remove carbon dioxide released from solution, and were heated by condensing steam within a U-tube (placed centrally in the cell) to maintain the temperature at the required value for a period of two weeks, after which the scale that had formed on the U-tube and the walls of the cell was removed, dried and weighed. The scaling rate for the tube was calculated as that weight of scale formed on the U-tube per liter of seawater fed to the cell and the total scaling rate as the weight of scale formed both on the U-tube and the walls of the cell per liter of seawater fed to the cell.

The percentage scale inhibition was then calculated using the equation $$\% \text{ scale inhibition } (B-T/B) \times 100$$

in which B is the tube scaling rate for the blank and T is the tube scaling rate for the test.

In all the following Experiments and Examples the acid used was sulphuric acid and the pH of the treated water was greater than 8.

Experiments were carried out using various additives at temperatures of 140° C. and 120° C. Experiments were carried out first with no additions of acid or additive and with additions of 50% and 75% of the theoretical amount of acid but without any additive. The following results were obtained.

| Acid Addition % | Temp °C. | Scaling Rate (mg/l) tube | total | % Inhibition |
|---|---|---|---|---|
| 0 | 104 | 16.9 | 60.7 | 0 |
| 50 | 104 | 11.2 | 24.0 | 34 |
| 75 | 104 | 4.3 | 14.8 | 74 |
| 0 | 120 | 10.5 | 22.9 | 0 |
| 50 | 120 | 9.7 | 17.7 | 8 |

Experiments were then carried out using the various additives specified below in different amounts, both alone and in conjunction with acid. The following results were obtained.

Using hydrolysed polymaleic anhydride

| Example | Additive concentration (ppm) | Acid Addition % | Temp. °C. | Scaling Rate (mg/l) tube | total | % Inhibition |
|---|---|---|---|---|---|---|
| — | 0.5 | 0 | 104 | 31.9 | 58.2 | −88 |
| — | 1.0 | 0 | 104 | 19.3 | 40.7 | −14 |
| 1 | 0.5 | 50 | 104 | 12.3 | 22.8 | 27 |
| — | 2.0 | 0 | 104 | 12.7 | 14.3 | 25 |
| 2 | 1.0 | 50 | 104 | 5.0 | 15.6 | 70 |
| — | 4.0 | 0 | 104 | 6.75 | 35.8 | 60 |
| 3 | 2.0 | 50 | 104 | 1.3 | 12.3 | 92 |
| — | 8.0 | 0 | 104 | 0.5 | 26.0 | 97 |
| 4 | 4.0 | 50 | 104 | 0.12 | 6.5 | 99 |
| — | 3.0 | 0 | 120 | 8.7 | 17.6 | 17 |
| — | 5.0 | 0 | 120 | 1.5 | 11.8 | 86 |
| 5 | 3.0 | 50 | 120 | 0.76 | 9.1 | 93 |
| — | 10.0 | 0 | 120 | 2.8 | 14.2 | 73 |
| 6 | 5.0 | 50 | 120 | 1.12 | 6.5 | 89 |
| — | 2.0 | 0 | 104 | 12.7 | 14.3 | 25 |
| 7 | 0.5 | 75 | 104 | 2.8 | 9.6 | 83 |
| — | 4.0 | 0 | 104 | 6.75 | 35.8 | 60 |
| 8 | 1.0 | 75 | 104 | 0.59 | 12.8 | 96 |
| — | 8.0 | 0 | 104 | 0.5 | 26.0 | 97 |
| 9 | 2.0 | 75 | 104 | 0.51 | 10.0 | 97 |

Using polyacrylic acid at 104° C.

| Example | Additive Concentration (ppm) | Acid Addition % | Scaling Rate (mg/l) tube | total | % Inhibition |
|---|---|---|---|---|---|
| — | 1.0 | 0 | 13.5 | 32.0 | 20 |
| 10 | 0.5 | 50 | 3.8 | 15.6 | 77 |
| — | 2.0 | 0 | 8.7 | 27.1 | 48 |
| 11 | 1.0 | 50 | 2.3 | 15.4 | 86 |
| — | 4.0 | 0 | 5.0 | 24.2 | 70 |
| 12 | 2.0 | 50 | 0.8 | 6.1 | 95 |
| — | 8.0 | 0 | 1.4 | 21.5 | 92 |
| 13 | 4.0 | 50 | 0.55 | 10.3 | 97 |

Using a terpolymer of maleic anhydride vinyl acetate and ethyl acrylate in a molar ratio of 9:2:1, at 104° C.

| Example | Additive concentration (ppm) | Acid Addition % | Scaling Rate (mg/l) tube | total | % Inhibition |
|---|---|---|---|---|---|
| — | 3.0 | 0 | 6.8 | 31.2 | 60 |
| 14 | 1.5 | 50 | 0.78 | 11.1 | 95 |
| — | 5.0 | 0 | 0.97 | 28.5 | 94 |
| 15 | 2.5 | 50 | 0.42 | 8.1 | 97 |

Using aminotris methylene phosphonic acid 104° C.

| Example | Additive concentration (ppm) | Acid Addition % | Scaling Rate (mg/l) tube | total | % Inhibition |
|---|---|---|---|---|---|
| — | 3.0 | 0 | 11.6 | 25.0 | 31 |
| 16 | 2.0 | 50 | 4.9 | 16.7 | 71 |
| — | 5.0 | 0 | 6.2 | 29.3 | 63 |
| 17 | 3.0 | 50 | 1.5 | 6.4 | 91 |

Using the compound

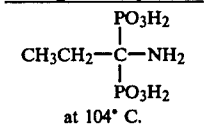

at 104° C.

| Example | Additive concentration (ppm) | Acid Addition % | Scaling Rate (mg/1) tube | total | % Inhibition |
|---|---|---|---|---|---|
| — | 2.0 | 0 | 7.74 | 13.7 | 54 |
| 18 | 1.0 | 50 | 1.87 | 6.82 | 90 |
| — | 3.0 | 0 | 1.74 | 5.5 | 90 |
| 19 | 1.5 | 50 | 1.0 | 4.6 | 94 |
| — | 5.0 | 0 | 0.39 | 5.16 | 98 |
| 20 | 3.0 | 50 | 0.3 | 5.6 | 98 |

Using polymethacrylic acid at 104° C.

| Example | Additive concentration (ppm) | Acid Addition % | Scaling Rate (mg/1) tube | total | % Inhibition |
|---|---|---|---|---|---|
| — | 12.0 | 0 | 4.42 | 26.7 | 74 |
| 21 | 6.0 | 50 | 0.9 | 10.9 | 95 |

The above results show the scale inhibiting effect of the method of the invention. Moreover they clearly show that the inhibition obtained is greater than would be expected from the results for scale inhibition by the additive alone and by the acid alone at the quantities used, since when 50% or 75% of the bicarbonate alkalinity present has been destroyed by acid, the proportionately reduced amount of additive still results in a better percentage scale inhibition than is achieved by the unreduced amount of additive, in absence of the acid.

What we claim is:

1. In a method for inhibiting the deposition of scale from saline water having bicarbonate alkalinity, onto the heat exchange surfaces of a saline water evaporation plant at temperatures between about 104° and 120° C., by the addition of a scale inhibiting additive selected from the group consisting of hydrolyzed polymaleic anhydride, polyacrylic acid, a terpolymer of maleic anhydride, vinyl acetate and ethyl acrylate, aminotrismethylene phosphonic acid,

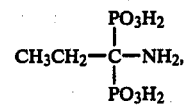

and polymethacrylic acid, said additive being employed in an amount of from 0.5 to 6 ppm of water to be treated, the improvement which comprises adding a mineral acid to the saline water to neutralize 50–75% of the bicarbonate alkalinity thereof, the amount of acid being such that the pH of the saline water which is flowing within the plant is not reduced below 7.5.

2. The method of claim 1 wherein the mineral acid is selected from the group consisting of hydrochloric acid and sulfuric acid.